(12) United States Patent
Craig et al.

(10) Patent No.: US 6,293,262 B1
(45) Date of Patent: Sep. 25, 2001

(54) INTAKE AIR TEMPERATURE CONTROL SYSTEM

(75) Inventors: Mark W. Craig, Dunlap; Tony G. Kertz, East Peoria, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/705,071

(22) Filed: Nov. 2, 2000

(51) Int. Cl.⁷ .................................................. F02M 21/04
(52) U.S. Cl. ................................. 123/542; 123/556
(58) Field of Search ........................... 123/542, 556

(56) References Cited

U.S. PATENT DOCUMENTS

| | | | |
|---|---|---|---|
| 5,172,753 | * 12/1992 | Kadle et al. | 123/542 |
| 5,375,580 | * 12/1994 | Stolz et al. | 123/542 |
| 6,182,643 | * 2/2001 | Canopy | 123/542 |

* cited by examiner

Primary Examiner—Marguerite McMahon
(74) Attorney, Agent, or Firm—Larry G. Cain

(57) ABSTRACT

A vehicle operates under various ambient conditions and various operating parameters. To compensate for the ambient condition and the operating parameters an engine, a donor intake air temperature is controlled. A donor intake air flow restriction system is used to vary the flow of the donor intake air through an air to air aftercooler. A valve is operatively moved between a closed position and an open position. A controller interprets a respective signal from a plurality of sensors to define the position of the valve.

19 Claims, 2 Drawing Sheets

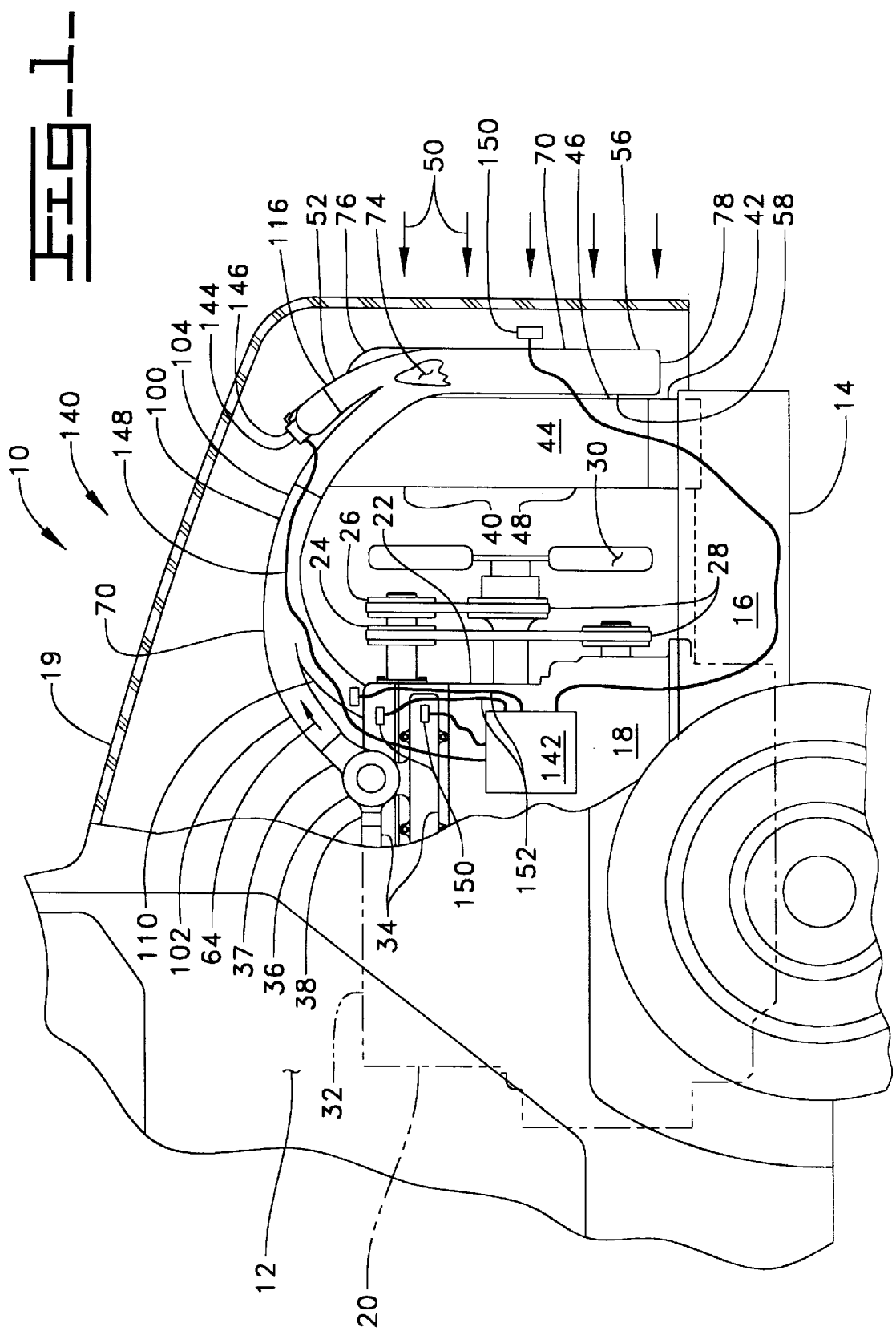

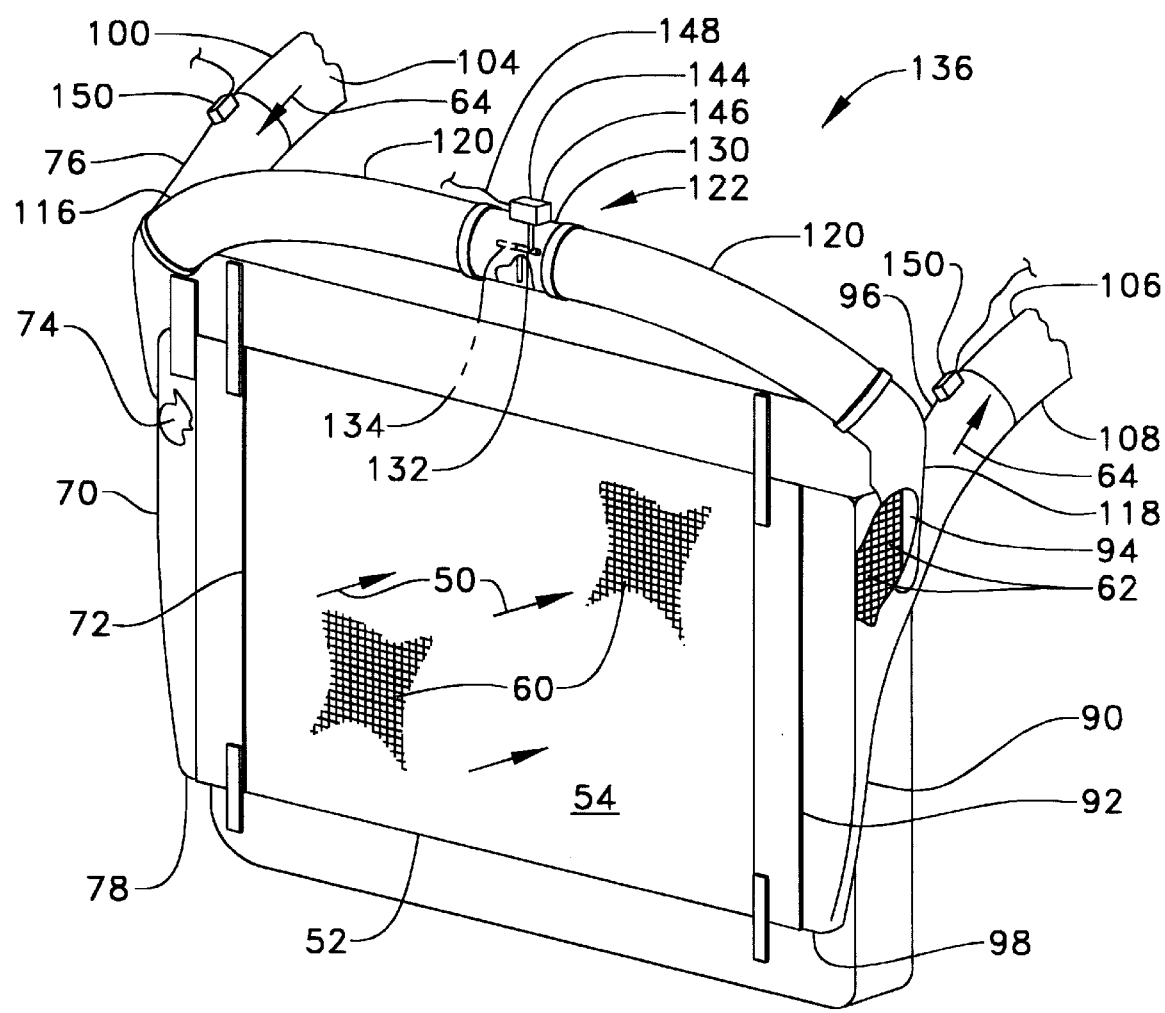
Fig_2_

INTAKE AIR TEMPERATURE CONTROL SYSTEM

TECHNICAL FIELD

This invention relates generally to an engine and more particularly to cooling intake air with an air to air aftercooler.

BACKGROUND ART

The use of turbocharged engines is a common practice. The turbocharger increases the quantity of air for combustion and increases the heat value or temperature of the intake air. To compensate for the increased temperature of the intake air, an aftercooler is used to reduce the temperature of the compressed intake air. Many of the cooling systems include a water jacket aftercooler. In the water jacket aftercooler a coolant from the engine is circulated through the aftercooler and the intake air is cooled. The use of engine coolant limits the temperature to which the intake air can be cooled. More recently, the cooling medium of the aftercooler has been converted to use ambient air and an air to air aftercooler has replaced the water jacket aftercooler. In some applications and under some operating conditions, the air to air aftercooler reduces the temperature of the intake air too much. Since ambient air is used as the coolant or recipient fluid, the temperature, pressure and humidity of the ambient air varies depending on geographic location and season. Thus, the temperature and humidity of the intake air varies accordingly. And, with the advent of exhaust gas recirculation to further reduce emissions, the mixture of the intake air with a varying humidity content and the exhaust gas to be recirculated has been found to form sulfuric acid which is detrimental to the engine. Under these varying conditions the combustion of the intake air and fuel results in varying characteristics. Under certain conditions the emissions therefrom can be increased due to the combustion temperature having the characteristic for forming excess hydrocarbons and other emissions. And, under other conditions, the structure of the engine can be damaged due to excessive power being developed. Thus, a system for controlling the temperature of the intake air is needed.

The present invention is directed to overcome one or more of the problems as set forth above.

DISCLOSURE OF THE INVENTION

In one aspect of the invention, an engine has a flow of donor intake air entering an intake manifold. The flow of donor intake air passes through an aftercooler and has a preestablished temperature. The aftercooler is of an air to air configuration. The engine has a recipient ambient air flow passing through the aftercooler, a sensor measuring a temperature of the recipient ambient air flow, a controller having a signal being transmitted from the sensor and the signal defining the temperature of the recipient ambient air flow, and a donor intake air flow restriction system defining a rate of flow of the donor intake air through the aftercooler.

In another aspect of the invention, a method of controlling a temperature of a donor intake air passing through an air to air aftercooler being cooled by a recipient ambient air flow is disclosed. The method has the following steps: sensing a temperature of the donor intake air; sensing the temperature of the recipient ambient air flow; comparing the temperature of the donor intake air against a fixed set of variables; comparing the temperature of the recipient ambient air flow against a fixed set of variables; and controlling a flow rate of the donor intake air flow through the air to air aftercooler.

In another aspect of the invention, a vehicle has an engine. The engine has a donor intake air flow communicated to an intake manifold. The donor intake air flow passes through an aftercooler of the air to air configuration. A recipient ambient air flow passes through the aftercooler. The vehicle has a sensor measuring a temperature of the recipient ambient air flow, a controller having a signal being transmitted from the sensor and the signal defining the temperature of the recipient ambient air flow; and a donor intake air flow restriction system defining a rate of flow of the donor intake air flow through the aftercooler.

BRIEF DESCRIPTION OF THE DRAWINGS

FIG. 1 is a partial side view of a vehicle embodying the present invention; and

FIG. 2 is an enlarged front pictorial view of an air to air aftercooler embodying the present.

BEST MODE FOR CARRYING OUT THE INVENTION

In FIG. 1 a vehicle 10 is shown. In this application, the vehicle 10 is an on highway tractor. However, as an alternative, the vehicle 10 could be any type of work machine, such as an off highway truck, scraper, wheel loader or track type machine. The vehicle 10 has a rear portion 12 and a front portion 14 being opposite one another. A frame 16 extends between the rear portion 12 and the front portion 14. Attached to the frame 16 and position in the vehicle 10 near the front portion 14 is an internal combustion engine 18. In this application, the internal combustion engine 18 is a compression ignition engine being water cooled; however, other types of internal combustion engines 18, such an a spark ignition, or a two or four cycle, can be used without changing the jest of the invention. The engine 18 has a conventional exhaust gas recirculation system therein. The vehicle 10 has a hood 19 attached to the front portion 14 of the frame 16. The engine 18 is positioned under the hood 19 and has a preestablished configuration. The engine 18 has a rear portion 20 from which power is transferred to a drive train, not shown. And, the engine 18 has a front portion 22 having a drive train 24 of convention construction being a part thereof. The drive train 24 has a plurality of driven pulleys 26 attached thereto. A plurality of belts 28 operationally connect to the respective ones of the plurality of driven pulleys 26 and drive a plurality of accessories 30, such as an alternators, a fan or fans and a pump or pumps. The engine 18 has a plurality of cylinders, not shown, and an intake manifold 32 being in communication with the plurality of cylinders. The engine 18 has an exhaust system 34 connected thereto and in communication with the plurality of cylinders. A turbocharger 36 is connected to the engine 18 and communicates with the intake manifold 32 by way of a compressor section 37 and the exhaust system 34 by way of a turbine section 38 in a conventional manner.

A radiator 40 is attached to the frame 16 in a conventional manner near the front portion 14 and is positioned under the hood 19. The radiator 40 has a frame 42 in which is positioned a core 44 having an air inlet side 46 and an air outlet side 48 positioned opposite one another. One of the plurality of accessories 30, the fan 30 is interposed the radiator 40 and the front portion 22 of the engine 18. In this application, the fan 30 is a sucker type configuration and creates a flow of recipient ambient air, designated by arrows 50. The fan 30 draws recipient ambient air from the inlet side 46 through the core 44 and out the outlet side 48. The radiator 40 is fluidly connected to the engine 18 and cools the coolant therein.

An aftercooler 52, as further shown in FIG. 2, is positioned in front of the inlet side 46 of the radiator 40. The recipient ambient air 50 passes through the aftercooler 52 prior to passing through the radiator 40. As an alternative, the aftercooler 52 can be placed downstream of the flow 50 through the radiator 40 near the air outlet side 48. As a further alternative, the aftercooler 52 can be placed above or below the radiator 40. As a further alternative, the aftercooler 52 can be placed remote from the radiator 40 and an auxiliary fan, not shown, can be used for circulating the recipient ambient air flow 50 therethrough. In this application, the aftercooler 52 has a core 54 having an ambient or recipient air inlet side 56 and an air outlet side 58. The core 54 has a plurality of recipient air passages 60 therein and a plurality of donor air passages 62 therein. The plurality of donor air passages 62 have a preestablished cross sectional area forming a preestablished backpressure. A donor intake air flow, designated by the arrow 64 exits the turbocharger 36 and is communicated to the plurality of donor air passages 62, the structure of which will be defined herebelow.

The aftercooler 52 is a cross flow aftercooler configuration and has an inlet or first manifold 70 attached to an inlet end 72 of the plurality of donor air passages 62 of the core 54. The inlet manifold 70 has a blending cavity 74 having a generally triangular configuration defining a base portion 76 and an apex portion 78. An outlet or second manifold 90, which is substantially a mirror image of the inlet manifold 70, is attached to an outlet end 92 of the plurality of donor air passages 62 of the core 54. The outlet manifold 90 has a blending cavity 94 having a generally triangular configuration defining a base portion 96 and an apex portion 98. An inlet duct 100 has an inlet end portion 102 operatively attached to the turbocharger 36. An outlet end portion 104 of the inlet duct 100 is blendingly attached to the inlet manifold 70 near the base portion 76. An outlet duct 106 has an inlet end portion 108 blendingly attached to the outlet manifold 90 near the base portion 96. An outlet end portion 110 is operatively attached to the intake manifold 32 of the engine 18. The inlet manifold 70 has a bypass member 116 attached thereto near the base portion 76. The bypass member 116 of the inlet manifold 70 has a preestablished cross sectional area being about 40 to 70 percent of the preestablished cross sectional area of the plurality of donor air passages 62. The outlet manifold 90 has a bypass member 118 attached thereto near the base portion 96. The bypass member 118 of the outlet manifold 90 has preestablished cross sectional area being about 40 to 70 percent of the preestablished cross sectional area of the plurality of donor air passages 62. A connecting member 120 is interposed the bypass member 116 of the inlet manifold 70 and the bypass member 118 of the outlet manifold 90. Positioned within the connecting member 120 is a donor intake air restriction device 122. In this application, the donor intake air restriction device 122 is a flapper or butterfly valve 130 being movable between a closed position 132 and an open position 134, shown in phantom. The valve 130 is infinitely variable between the closed position 132 and the open position 134. As an alternative, the donor intake air restriction device 122 can be of another configuration, such as a ball valve or a guillotine configuration. The bypass member 116 of the intake manifold 70, the connecting member 120, the valve 130 and the bypass member 118 of the outlet manifold 90 define a donor intake air flow restriction system 136. In this application, the bypass member 116 of the inlet manifold 70, the bypass member 118 of the outlet manifold 90, the connecting member 120 and the valve 130 are positioned within the preestablished configuration of the hood 19. The aftercooler 52 is attached to the frame 42 of the radiator 40 in a conventional manner.

A control system 140 operatively controls the position of the valve 130 between the closed position 132 and the open position 134.

The control system 140 has a controller 142 which in this application is a part of the engine 18 configuration. However, as an alternative, the controller 142 can be a separate unit without changing the jest of the invention. An actuator 144 is in operative communication with the controller 142 and the valve 130. For example, an electric solenoid 146 has a wire 148 communicating with the controller 142 and a signal having a varying magnitude is transmitted to the solenoid 146 through the wire 148. The solenoid 146 operatively moves the valve 130 between the closed position 132 and the open position 134. As an alternative, the actuator 144 can be a cylinder being pneumatically or hydraulically actuated by a supply line. A plurality of sensors 150 are attached to the engine 18 in predetermined locations. For example, some of such predetermined locations are within the intake manifold 32 and within the exhaust system 34. Another portion of the plurality of sensors 150 are positioned within the flow of the recipient ambient air 50 and within the flow of donor intake air 64 before entering the inlet end 72 and after exiting the outlet end 92 of the aftercooler 52. A plurality of wires or transmitting members 152 are interposed the plurality of sensors 150 and the controller 142 and a signal or pulse or pressure is transmitted therethrough between the respective one of the plurality of sensors 150 and the controller 142.

Industrial Applicability

In operation, the vehicle 10 is operating in an environment having a hot temperature, for example being consistently 90 degrees Fahrenheit or above. Under these conditions, the donor intake air 64 needs to be cooled to or near its maximum temperature in order to provide maximum power output of the engine 18. Thus, the plurality of sensors 150 monitor operating conditions of the engine 18 and communicate the respective signals to the controller 142. The controller 142 stores, computes, and integrates the signals depending on a fixed set of variables. And, under the operating conditions of the environment, hot temperature, the actuator 144 maintains the valve 130 in the closed position 132. Thus, the maximum flow of donor intake air 64 passes through the core 54 of the aftercooler 52 and the donor intake air 64 is cooled to or near its maximum.

In another example, the vehicle 10 is operating in an environment having a cold temperature, for example being consistently 50 degrees Fahrenheit or below. Under these conditions, the donor intake air 64 needs to be prevented from being cooled in order to prevent structural damage to the engine 18, efficient operation of the engine 18 and prevent excess emissions. Thus, the plurality of sensors 150 monitor operating conditions of the engine 18 and communicate the respective signals to the controller 142. The controller 142 stores, computes, and integrates the signals depending on a fixed set of variable. And, under the operating conditions of the environment, cold temperature, maintains the valve 130 in the open position 134. Thus, due to the preestablished cross sectional area of the donor air passages 62 and the backpressure created thereby the minimum flow of donor intake air 64 passes through the core 54 of the aftercooler 52. The majority of the donor intake air 64 passes through the bypass member 116 of the intake manifold 70, the connecting member 120, the valve 130 and the bypass member 118 of the outlet manifold 90 and to the intake manifold 32 of the engine 18. Thus, the cooling of the donor intake air 64 is reduced or prevented from being cooled to its maximum.

If the vehicle 10 is operating in an environment which is not the hot nor is it the cold temperature, for example being consistently between 50 and 70 degrees Fahrenheit, the restriction system 72 must be operated with the valve 130 between the closed position 132 and the open position 134. Under these conditions, the donor intake air 64 needs to be cooled but not to its maximum or to its minimum in order to provide maximum power output of the engine 18, control emissions from the engine 18 and efficiently operate the engine. Thus, the plurality of sensors 150 monitor operating conditions of the engine 18 and communicate the respective signals to the controller 142. The controller 142 stores, computes, and integrates the signals depending on a fixed set of variable. And, under the operating conditions of the environment, neither hot or cold temperature, maintains the valve 130 in a position intermediate the closed position 132 and the open position 134. As the temperature of the environment changes, the position of the valve 130 will also vary between the closed position 132 and the open position 134 accordingly. Thus, the appropriate flow of donor intake air 64 passes through the core 54 of the aftercooler 52 and the donor intake air 64 is cooled to its proper temperature to effectively operate the engine 18 under all ambient environmental conditions.

Thus, with the donor intake air flow restriction system 136 the temperature of the donor intake air 64 can be monitored and controlled to a predetermined temperature. As the ambient temperature of the recipient ambient air 50 varies between hot and cold, the donor intake air flow restriction device 122, specifically the valve 130 controls the flow rate of donor intake air 64 through the aftercooler 52. Thus, if the donor intake air 64 needs to be cooler, the rate of flow of the donor intake air 64 bypassing the aftercooler 52 is reduced. And, similarly, if the donor intake air 64 needs to be warmer, the rate of flow of the donor intake air 64 bypassing the aftercooler 52 is increased.

Other aspects, objects and advantages of this invention can be obtained from a study of the drawings, the disclosure and the appended claims.

What is claimed is:

1. An engine having a flow of donor intake air entering an intake manifold, said flow of donor intake air passing through an aftercooler and having a preestablished temperature, said aftercooler being of an air to air configuration, said engine comprising:
    a recipient ambient air flow passing through said aftercooler;
    a sensor measuring a temperature of said recipient ambient air flow;
    a controller having a signal being transmitted from said sensor and said signal defining said temperature of said recipient ambient air flow; and
    a donor intake air flow restriction system defining a rate of flow of said donor intake air through said aftercooler.

2. The engine of claim 1 wherein said donor intake air flow restriction system includes a valve being movable between a closed position and an open position.

3. The engine of claim 2 wherein said temperature of said recipient ambient air flow being hot and said valve being at said closed position.

4. The engine of claim 2 wherein said temperature of said recipient ambient air flow being cold and said valve being at said open position.

5. The engine of claim 2 wherein said temperature of said recipient ambient air flow being neither hot and cold and said valve being intermediate said closed position and said open position.

6. The engine of claim 2 wherein said valve being infinitely movable between said closed position and said open position.

7. The engine of claim 1 wherein said controller being a part of said engine.

8. The engine of claim 1 wherein said donor intake air flow restriction system includes an actuator being connected to a valve and operatively moving said valve between a closed position and an open position.

9. The engine of claim 8 wherein said aftercooler having a preestablished backpressure and said donor intake air flow restriction system having a backpressure being less than said backpressure of said aftercooler.

10. A method of controlling a temperature of a donor intake air passing through an air to air aftercooler being cooled by a recipient ambient air flow, said method comprising the following steps:
    sensing a temperature of said donor intake air;
    sensing the temperature of said recipient ambient air flow;
    comparing the temperature of said donor intake air against a fixed set of variables;
    comparing the temperature of said recipient ambient air flow against a fixed set of variables; and
    controlling a flow rate of said donor intake air flow through said air to air aftercooler.

11. The method of controlling the temperature of the donor intake air flow of claim 10 wherein said step of controlling the flow rate of said donor intake air flow through said air to air aftercooler includes bypassing a portion of the donor intake air flow through a donor intake air flow restriction system.

12. The method of controlling the temperature of the donor intake air of claim 11 wherein said step of comparing the temperature of said recipient ambient air flow against said fixed set of variables defines said temperature being cold.

13. The method of controlling the temperature of the donor intake air of claim 10 wherein said controlling the flow rate of said donor intake air flow through said air to air aftercooler includes a valve being in a closed position and all of said donor intake air flow passing through said air to air aftercooler.

14. The method of controlling the temperature of the donor intake air of claim 13 wherein said step of comparing the temperature of said recipient ambient air flow against said fixed set of variables defines said temperature being hot.

15. The method of controlling the temperature of the donor intake air of claim 10 wherein said step of controlling the flow rate of said donor intake air flow includes a step of moving a valve intermediate a closed position and an open position.

16. The method of controlling the temperature of the donor intake air of claim 15 wherein said step of moving said valve intermediate said closed position and said open position including said movement therebetween being infinitely variable.

17. A vehicle having an engine, said engine having a donor intake air flow being communicated to an intake manifold, said donor intake air flow passing through an aftercooler being of the air to air configuration and having a recipient ambient air flow passing through said aftercooler, said vehicle comprising:

a sensor measuring a temperature of said recipient ambient air flow;

a controller having a signal being transmitted from said sensor and said signal defining said temperature of said recipient ambient air flow; and a donor intake air flow restriction system defining a rate of flow of said donor intake air flow through said aftercooler.

18. The vehicle of claim 17 wherein said vehicle includes a hood having a preestablished configuration and said donor intake air flow restriction system being fitted under said hood.

19. The vehicle of claim 18 wherein said donor intake air flow restriction system including a valve being movable between a closed position and an open position, said temperature of said recipient ambient air flow being hot and said valve being at said closed position and said temperature of said recipient ambient air flow being cold and said valve being at said open position.

* * * * *